United States Patent [19]
von Flotow et al.

[11] Patent Number: 5,873,559
[45] Date of Patent: Feb. 23, 1999

[54] ADAPTIVELY TUNED VIBRATION ABSORBER FOR REDUCTION OF AIRCRAFT CABIN NOISE

[75] Inventors: Andreas H. von Flotow; Mathieu Mercadal, both of Hood River; Kelvin B. Scribner, The Dalles; Timothy Mixon; Corydon Roeseler, both of Hood River, all of Oreg.

[73] Assignee: Applied Power Inc., Butler, Wis.

[21] Appl. No.: 839,275

[22] Filed: Apr. 17, 1997

[51] Int. Cl.⁶ .............................. F16M 13/00; G01M 7/00
[52] U.S. Cl. ..................... 248/557; 248/550; 364/508; 181/33
[58] Field of Search ..................... 248/550, 554, 248/557; 364/508

[56] References Cited

U.S. PATENT DOCUMENTS

| | | | |
|---|---|---|---|
| 3,487,888 | 1/1970 | Adams et al. ............. | 181/33 |
| 3,490,556 | 1/1970 | Bennet et al. ............. | 181/33 |
| 3,606,233 | 9/1971 | Scharton et al. .......... | 248/358 |
| 3,635,427 | 1/1972 | Balke ...................... | 244/17.27 |
| 4,483,425 | 11/1984 | Newman ................... | 188/378 |
| 4,715,559 | 12/1987 | Fuller ...................... | 244/1 N |
| 5,332,061 | 7/1994 | Majeed et al. ............ | 180/312 |
| 5,456,341 | 10/1995 | Garnjost et al. .......... | 188/378 |
| 5,520,375 | 5/1996 | Leibach et al. ........... | 267/140.14 |
| 5,564,537 | 10/1996 | Shoureshi ................. | 188/380 |
| 5,626,332 | 5/1997 | Philips et al. ............ | 267/140.14 |
| 5,628,499 | 5/1997 | Ikeda et al. .............. | 267/140.14 |
| 5,710,714 | 1/1998 | Mercadal et al. ......... | 364/508 |
| 5,713,438 | 2/1998 | Rossetti et al. ........... | 188/378 |

*Primary Examiner*—Leslie A. Braun
*Assistant Examiner*—Michael Nornberg
*Attorney, Agent, or Firm*—Quarles & Brady

[57] ABSTRACT

An aircraft engine is attached to the fuselage by a mounting structure that has a vibration absorbing system which includes first and second sensors to produce signals indicating vibration along two orthogonal axes. A third sensor, such as an accelerometer, is coupled to the mounting structure for sensing vibration of the engine. A tachometer circuit, connected to the third sensor, produces first and second speed signals that indicate the speeds of two rotating spools in the engine. Four vibration absorbers are attached to the engine mounting structure and controllers are provided to dynamically tune the resonant frequency of each vibration absorber in response to a unique combination of one of the two vibration signals and one of the two speed signals. Thus the vibration absorbers reduce the engine spool vibrations that are transmitted through the mounting structure along the two orthogonal axes. The resonant frequency of each absorber is altered to track variation of the vibrations due to changes in engine speed.

10 Claims, 7 Drawing Sheets

ADAPTIVELY TUNED VIBRATION ABSORBER FOR REDUCTION OF AIRCRAFT CABIN NOISE

BACKGROUND OF THE INVENTION

The present invention relates to devices for countering vibration in structural members, such as those of an aircraft fuselage; and particularly to such devices which can be dynamically tuned to adapt performance to changes in vibration frequency.

Aircraft engines can induce significant vibration into the fuselage. In propeller powered planes, the propeller blades produce air pressure patterns which strike external surfaces thereby causing a time periodic vibration of the structure, at about 100 Hz for example, which vibration is transferred to other structural members of the airframe. Jet engines also produce vibration in supporting members. If left unchecked, the induced vibrations create objectionable noise in the aircraft cabin, and may result in serious fatigue of the airframe.

As a consequence, vibration absorbers are attached to structural members throughout the aircraft. These devices typically are a simple spring-mass system in which a mass is attached to the airframe by a resilient member that acts as a spring. Elastomeric pads and metal cantilevers have been employed as the spring. The spring-mass system is fixedly tuned to resonate at the frequency of common vibration in the structural member of the airframe to which the absorber is attached and thus optimally absorbs the vibration energy at that tuned frequency. The absorber has a large mechanical impedance at resonance which is due mostly to a high quality factor Q. Absorption (mechanical impedance) at other frequencies diminishes as a function of the deviation from the resonant frequency.

Figure 1:
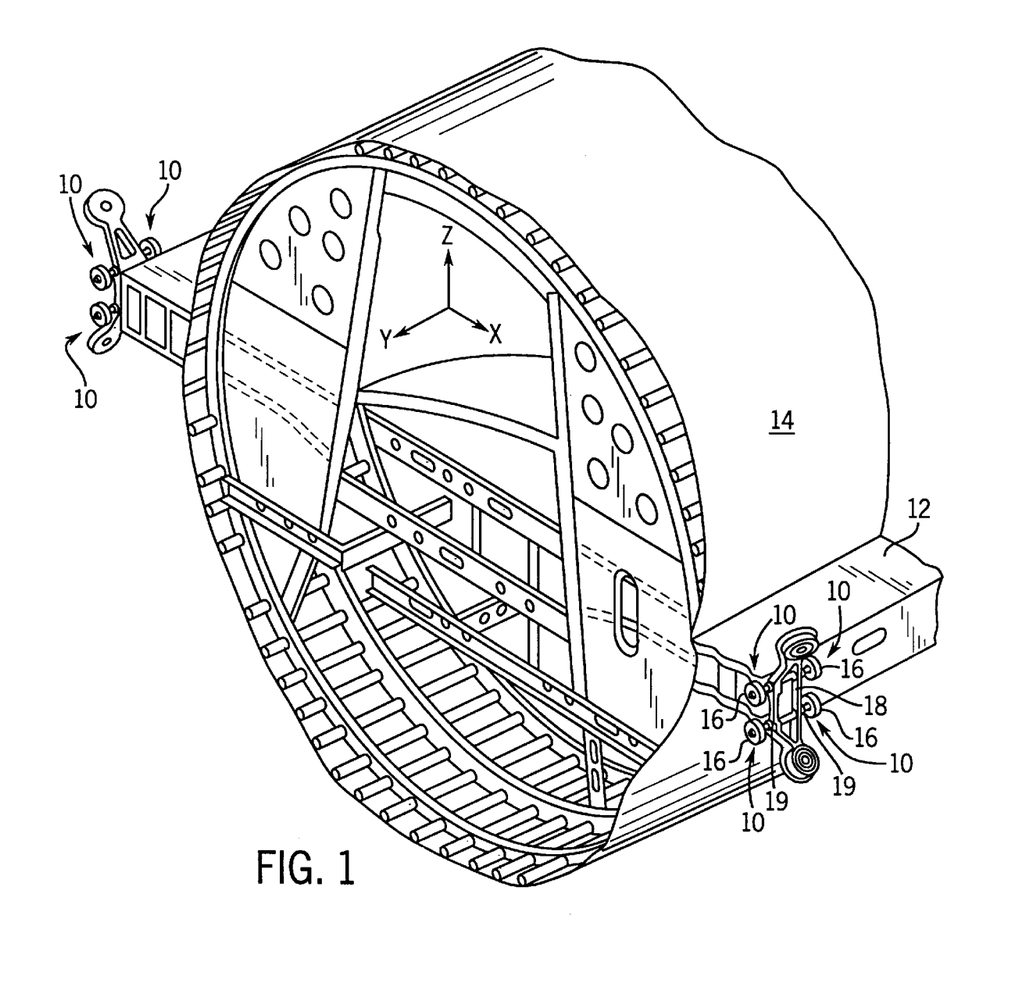
FIG. 1 is a cut-away isometric view of an airplane fuselage which utilized prior art passive vibration absorbers attached to the engine mounts.

U.S. Pat. No. 3,490,556 discloses passive vibration absorbers 10 attached to pylons 12 to which the jet engine connects at the aft portion of the fuselage 14 on the Douglas Aircraft DC9-V series airplane as shown in FIG. 1. Four masses 16 are supported from each jet engine support yoke 18 by a separate cantilevered beam 19 which acts as a spring. These absorbers 10 are tuned to vibrational frequencies produced by the two engine rotors N1 and N2 which occur at the nominal cruise power setting of the engine.

One drawback of fixedly tuned absorbers is that the airframe vibration frequencies vary with engine speed, especially in the case of jet engines. Although the absorber may be tuned to the vibration frequency which occurs at the nominal cruising speed of the aircraft, less than optimal vibration absorption occurs at other speeds. In addition, the tuning of elastomeric type absorbers changes with the age of the elastomeric material, and tuning of both elastomeric and metal spring type absorbers change with temperature.

Therefore, it is desirable to provide an absorption system which dynamically adapts to variation of the vibration frequency.

SUMMARY OF THE INVENTION

An object of the present invention is to provide a system for absorbing time periodic vibrations in structural members wherein the system is autonomously capable of adapting to different vibration frequencies.

Another object is to provide a mechanism for indirectly sensing rotational speed of the engine, and more specifically the two engine spools, to produce speed-indicating signals for dynamically tuning the vibration absorbers.

The first objective is fulfilled by a vibration absorber that has a base for attaching to a structural member. A mass is coupled to the bases by a spring which in the preferred embodiments may be one or a plurality of straps or rods. A mechanism adjusts the stiffness of the spring in response to a control signal. Specifically, the mechanism changes the tension or compression force acting on the rods. In the preferred embodiment, the mass is suspended from a mounting base between two sets of such rods, each set constituting a flexure type spring assembly. A tuning mechanism alters the stiffness of springs by adjusting tension and compression in these rods and thus the resonant frequency of the vibration absorber.

The tuning mechanism includes vibration sensors which produce signals that can be analyzed to determine effectiveness of the vibration absorption. A control circuit receives signals from the vibration sensors and another signal representing the engine speed. The control circuit responds to these signals by producing the control signal which causes the tuning mechanism to adjust the spring stiffness so that the spring and mass are tuned to resonate in a manner that optimally absorbs vibration of the structural member.

The control circuit includes a novel sub-system for indirectly sensing the engine speed, thereby avoiding the requirement for recertification of an engine tachometer by regulatory authorities if direct speed sensing was employed. The sub-system includes an accelerometer coupled to the engine. This sensor is dominated by the associated engine and the tachometer logic is not distracted by the other engine which operates at nearly an identical frequency.

DETAILED DESCRIPTION OF THE INVENTION

Figure 2:
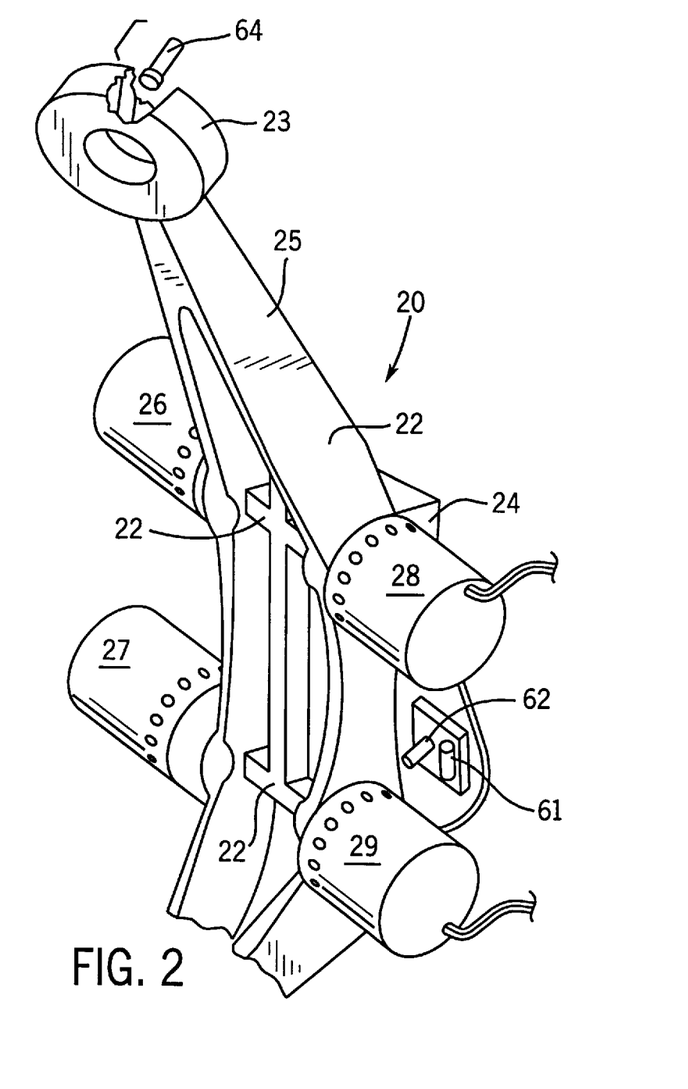
FIG. 2 is an isometric view of an engine mounting structure with a vibration absorber system according to the present invention.

With initial reference to FIG. 2, an engine mounting structure 20 is similar to the previous aircraft engine mounts. Specifically, the mounting structure 20 is formed by a support yoke 25 fixed to the outer edge of a pylon 24 which projects from the aircraft fuselage. In the Douglas Aircraft Company DC-9 series aircraft, the support yoke 25 is a single forging which is fastened to the pylon 24 by a pair of bolts (not visible) with ends that extend outward from the support yoke. The ends of the support yoke 25 have annular cups 23 which house resilient mounts through which bolts pass to attach the engine. In other aircraft types, the engine support yoke is constructed differently. A separate vibration absorber 26, 27, 28 or 29 is connected to the exposed ends of yoke cross rods 22 with vibration absorbers 26 and 27 being on the forward side of support yoke 25 and vibration absorbers 28 and 29 being on the aft side.

Figure 3:
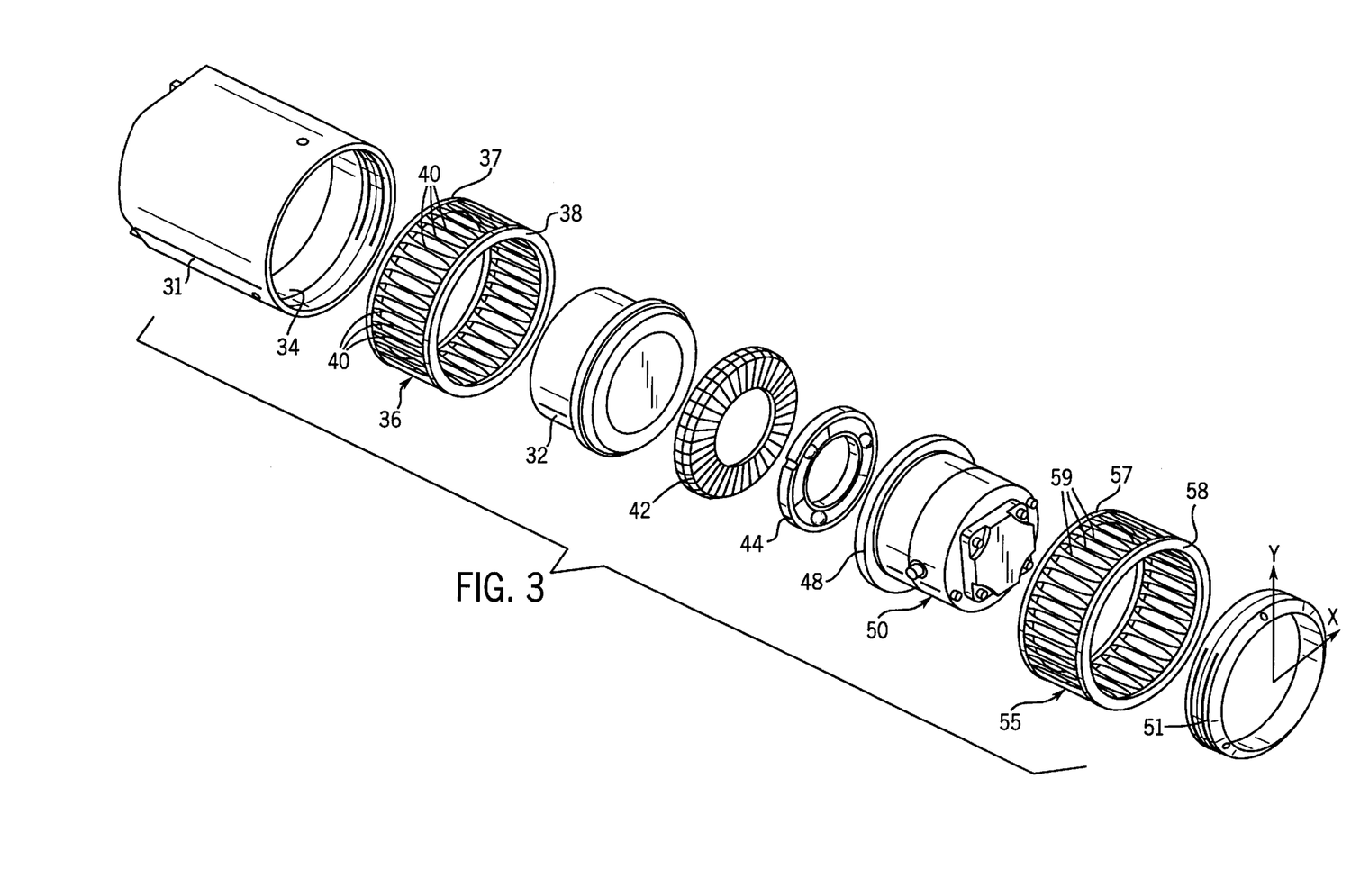
FIG. 3 is an exploded isometric view of one of the vibration absorbers in FIG. 2.
Figure 4:
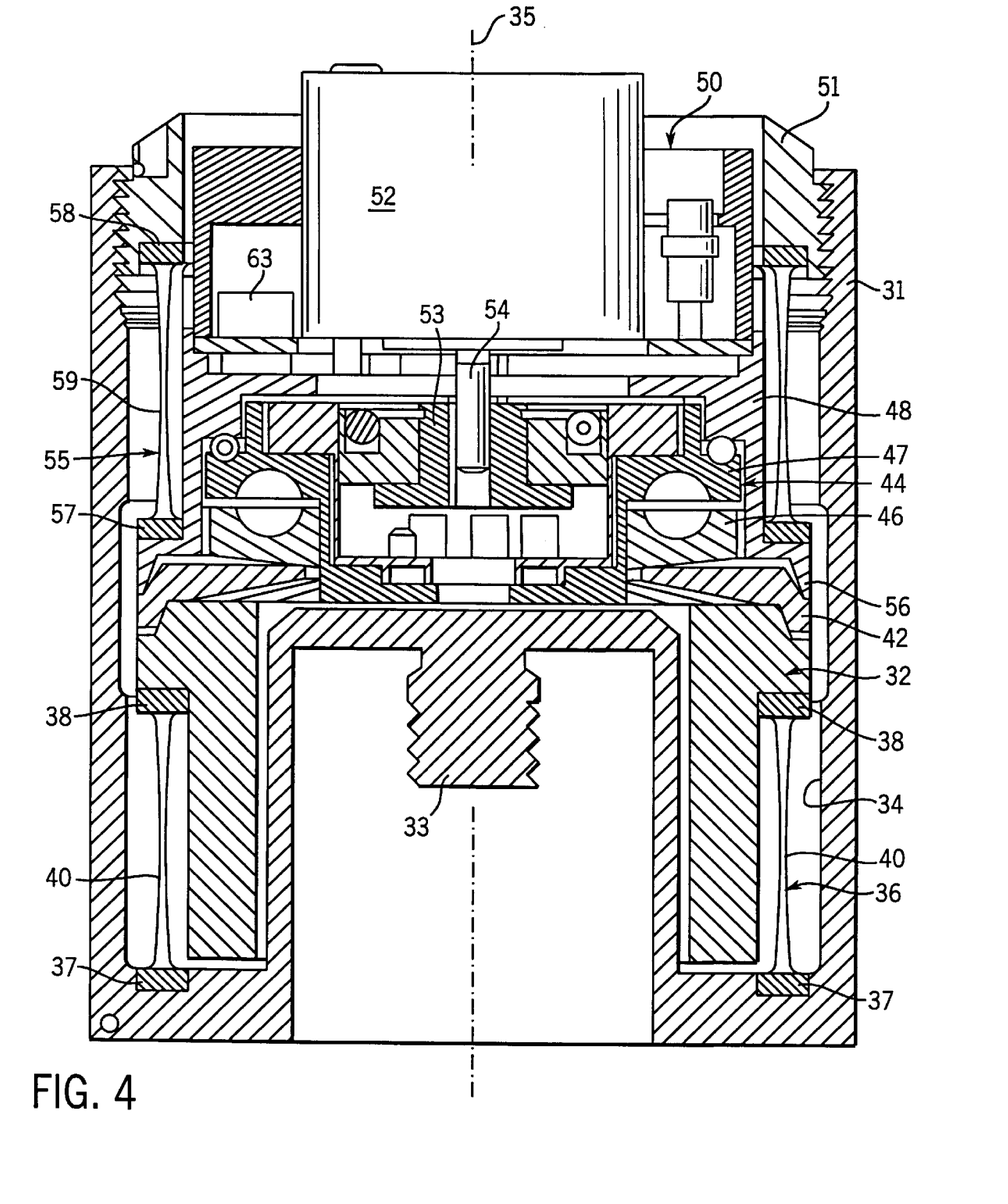
FIG. 4 is a longitudinal cross section view of an assembled vibration absorber.

FIGS. 3 and 4 show the details of one of the vibration absorbers 26. This exemplary vibration absorber 26 includes an circular cup-like outer housing 31 with a closed end that has a mounting stud 33 for coupling to ends of cross rods 22 of the engine mounting structure 20. The vibration absorber 26 counteracts vibrations occurring along two orthogonal axes that lie in a plane which is perpendicular to the longitudinal axis 35 of the vibration absorber.

A cylindrical, tubular proof-mass 32 is located within the cavity 34 of the outer housing 31 and is spaced from the closed end of the housing by a first flexure assembly 36. The first flexure assembly 36 comprises two circular rings 37 and 38 that are parallel to each other with a plurality of rods 40 extending therebetween. This construction enables rods 40 to flex and act as a spring. A ring lever 42 abuts the side of the proof-mass 32 which is remote from the first flexure assembly 36. A ramped thrust bearing 44 engages central portion of the opposite side of the ring lever 42 and comprises two races 46 and 47.

A motor assembly 50 has a tubular section 48 which surrounds the thrust bearing 44 and contacts the outer circumferential region of the ring lever 42. The motor assembly 50 has a bidirectional stepper motor 52, such as model 421817-01-HT1 manufactured by LIN Engineering of Santa Clara, Calif. USA, in which the direction of rotation determined by applied electrical signals. Alternatively, a DC motor may be used. The motor has an output shaft 54 connected to a 100:1 harmonic drive gearbox 53 which drives the upper race 47 of the ramped thrust bearing 44. The thrust bearing's lower race 46 is splined at the outer diameter and engages a tubular section 48 of the motor assembly 50 thereby preventing the lower race from rotating while allowing longitudinal movement within the housing 48.

A second flexure assembly 55 rests against a flange 56 which projects outwardly from the tubular section 48 of the motor assembly 50, but is spaced from the inner surface of the housing 31. The second flexure assembly 55 is identical to the first flexure assembly 36 and is formed by two circular rings 57 and 58 that are parallel to each other with a plurality of rods 59 extending therebetween. The rods 59 also are flexible and act as springs. A ring nut 51 with external threads is threaded into the open end of the housing 31 and abuts ring 58 of the second flexure assembly 55. The ring nut 51 preloads first and second flexure assemblies 36 and 55 in compression.

The combined mass of the proof-mass 32 and the motor assembly 50 is supported freely within the housing 31 by two first and second flexure assemblies 36 and 55. The first and second flexure assemblies 36 and 55 act as springs which allow this combined mass to oscillate in two orthogonal axes X and Y in a plane which is perpendicular to the longitudinal axis 35 of the vibration absorber 26. The spring and proof-mass combination has a resonant frequency of oscillation that is a function of their combined mass and the stiffness of the springs formed by the first and second flexure assemblies 36 and 55. When this resonant frequency matches the frequency of the vibration in the engine mounting structure 20, the vibration energy is absorbed optimally by the proof-mass oscillation.

By altering compression of the rods 40 and 59 in the flexure assemblies, the spring stiffness can be changed to vary the resonant frequency and maintain optimal tuning of the vibration absorber 26. Activation of the motor assembly 50 produces rotation of the motor output shaft 54 which results the upper race 47 of the thrust bearing 44 turning with respect to the lower race 46. Depending upon the direction of that rotation, greater or lesser force is applied to ring lever 42 in a direction along the longitudinal axis 35 of the vibration absorber 26. This change in force causes the ring lever 42 to flex between the proof-mass 32 and the tubular section 48 of the motor assembly 50 which alters the distance between those components 32 and 48. This alteration of the spacing changes compression of rods 40 and 59 of the first and second flexure assemblies 36 and 55, respectively, and thus the spring stiffness of the vibration absorber 26.

The motor assembly 50 is driven by a controller 60 to vary the spring stiffness of each vibration absorber 26–29 in response to changes in the structural vibrations as sensed by accelerometers. Referring again to FIG. 2, the structural vibrations are sensed by two airframe accelerometers 61 and 62 attached to the pylon 24. The airframe accelerometers 61 and 62 and are oriented to sense vibrations along orthogonal axes that are parallel to the axes along which the proof-mass 32 in each absorber 26–29 can oscillate. The first airframe accelerometer 61 senses vertical acceleration and is used to control the two forward vibration absorbers 26 and 27 on engine mounting structure 20 and the second airframe accelerometer 62 senses horizontal acceleration and is used to control the two aft mounted vibration absorbers 28 and 29.

As shown in FIG. 4, each vibration absorber 26–29 has an accelerometer 63 fixed to the motor assembly 50 to provide a signal indicative of proof-mass vibration along an axis perpendicular to the longitudinal axis 35. This proof-mass accelerometer 63 for a given vibration absorber 26, 27, 28 or 29 is oriented to sense movement along an axis that is parallel to the sensing axis of the airframe accelerometers 61 or 62 coupled to the given vibration absorber. For example, the proof-mass accelerometer 63 for vibration absorber 26 and the associated airframe accelerometer 61 both sense vertical vibrations.

With reference to FIG. 2, another accelerometer 64 is affixed to the engine mounting support within the upper annular cup 23 of the support yoke 25 and thus is rigidly coupled to the case of the engine for sensing engine speed. A commonly used jet engine has two spools, designated N1 and N2, that rotate at different speeds. The speeds of spools N1 and N2 are derived from a signal produced by speed accelerometer 64, as will be described.

Figure 5:
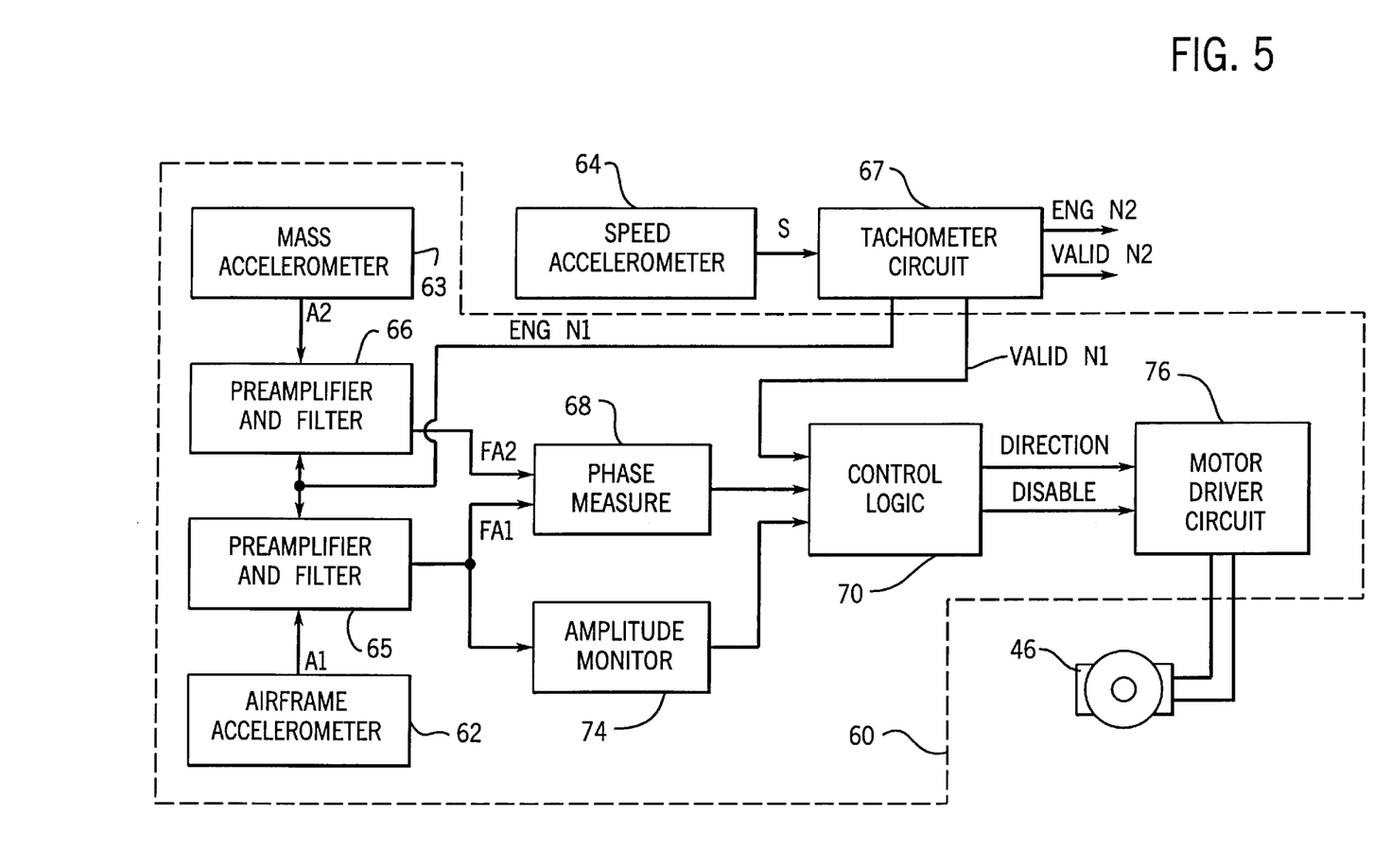
FIG. 5 is a block schematic diagram of a control circuit for dynamically tuning one of the vibration absorbers.

Each of the four vibration absorbers 26–29 may have a separate controller 60, shown in FIG. 5, to which the appropriate airframe accelerometer 61 or 62 is connected. Alternatively, a single digital signal processor can execute a software program to process the accelerometer signals in the same manner as controller 60 to control one or all four vibration absorbers 26–29 associated with one engine. In the multiple controller implementation, the airframe accelerometer 61 which senses vertical acceleration is connected to the controller 60 for the two forward vibration absorbers 26 and 27 on the engine mounting structure 20 and the other airframe accelerometer 62 which senses horizontal acceleration is connected to the controllers 60 for the two aft mounted vibration absorbers 28 and 29.

To facilitate the description, the controller 60 for the top forward vibration absorber 26 will be described, with the understanding the same functionality applies to controllers for the other vibration absorbers 27, 28 and 29 which receive signals from the other airframe accelerometer and/or the other spool speed signal.

Figure 6:
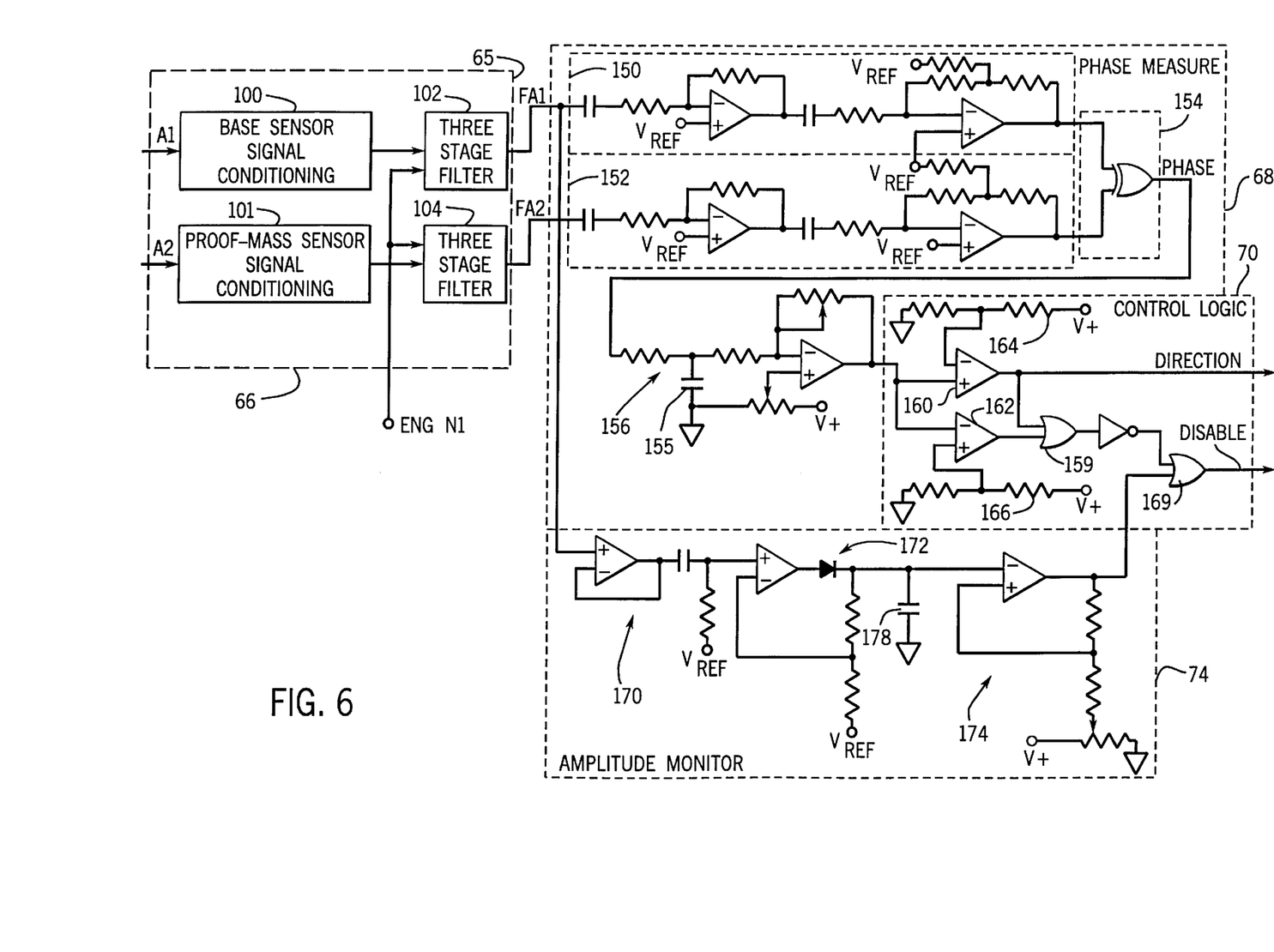
FIG. 6 is a schematic diagram of an implementation of a portion of the control circuit in FIG. 6.

The details of blocks in the circuit diagram of FIG. 5 are shown in FIG. 6. The signal A1 from the associated airframe accelerometer 61 is connected to a preamplifier and filter circuit 65 and the signal A2 from proof-mass accelerometer 63 for the corresponding vibration absorber 26 is connected to another preamplifier and filter circuit 66. Both preamplifier and filter circuits 65 and 66 process the accelerometer signals A1 and A2 in the same manner. That is the two accelerometer signals A1 and A2 are applied to separate signal conditioning stages 100 and 101 with the resultant signals being fed to a different cascaded three stage filter 102 or 104, respectively, which aggressively filter the accelerometer signals to eliminate extraneous frequency components in resultant filtered signals FA1 and FA2.

One requirement of such aggressive filtering is that the filters need to be closely matched to one another and need to be adjusted to track the engine spool rotational frequency. Filter stages 104–107 are electrically tuned to the speed of one of the engine spools N1 or N2. The stages of these filters 102 and 104 are bandpass types with a center frequency tuned to the speed of a selected one of the engine spools. For an analog embodiment, the filter stages preferably are implemented using a switched capacitor filter network, such as a LTC1060 integrated circuit manufactured by Linear Technology Corporation, in which the center bandpass frequency is set by the frequency of a CLOCK signal which corresponds to the speed of the one engine spool (N1EST or N2EST). The controllers for the top vibration absorbers 26 and 28 receive a signal N1EST indicating the speed of the N1 spool while controllers for the bottom vibration absorbers 27 and 29 receive a signal N2EST indicating the speed of the N2 spool.

The two spool speed signals N1EST and N2EST are derived by a common tachometer circuit 67 for all four vibration absorbers 26 coupled to the same engine mounting structure 20. The tachometer circuit 67 receives the output signal S from the speed accelerometer 64 at an input shown in FIG. 7. This signal S is applied to an analog bandpass filter 200 to attenuate frequency components outside the 80 Hz to 200 Hz band that cannot originate from one of the engine spools N1 or N2. In a digital implementation, the filtered signal is digitized by a twelve bit analog-to-digital converter (ADC) 202 operating at 4 kHz.

Figure 7:
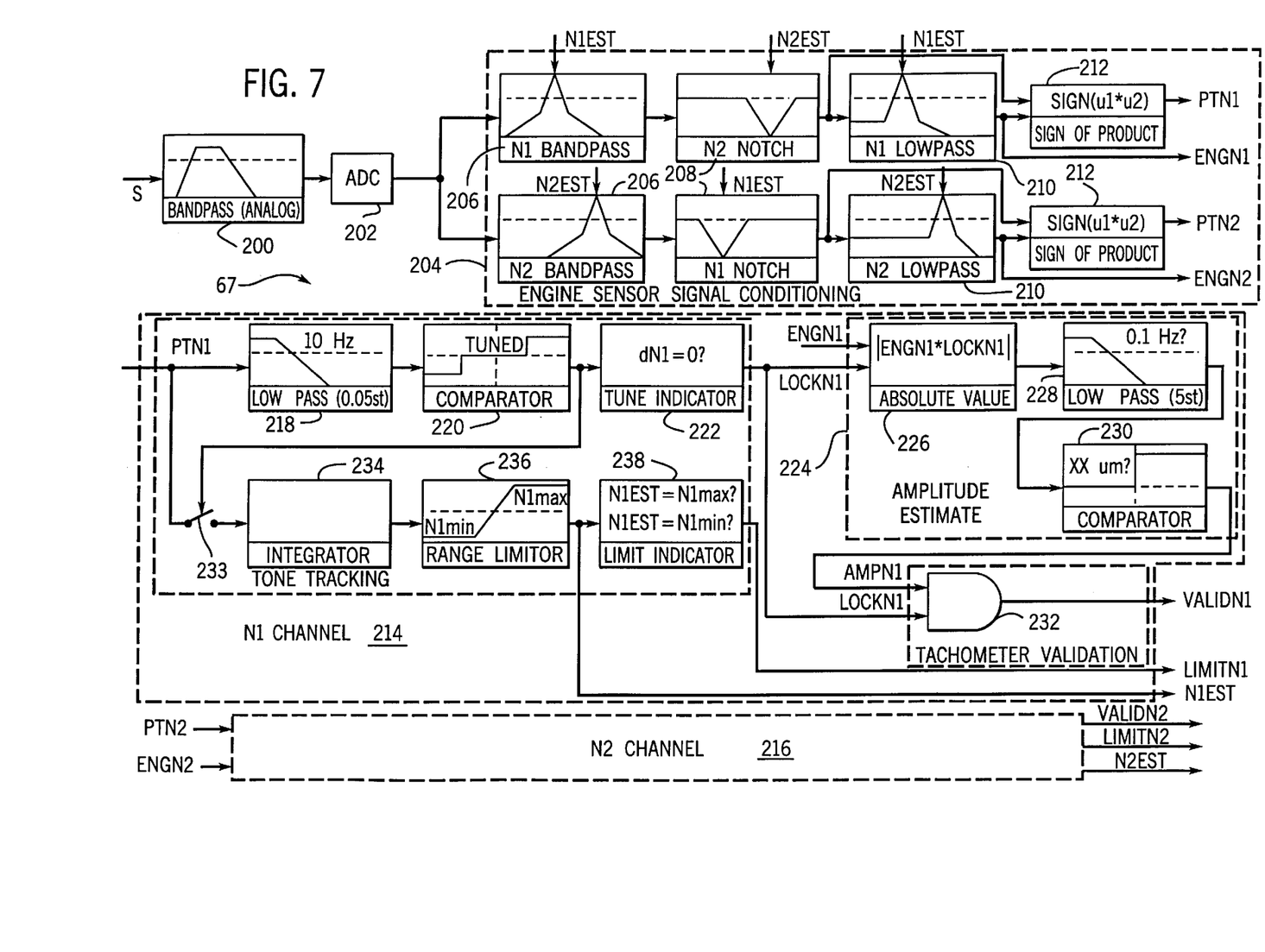
FIG. 7 is a functional block diagram of the circuit for deriving engine speed from an accelerometer attached to the engine mount.

The digitized signal is fed to an engine sensor signal conditioning logic 204 which has individual branches for separating the frequencies representing the speed of each engine spool N1 or N2. These branches have identical filter chains but are tuned differently to select the frequency of the respective engine spool, e.g. the upper and lower branches in FIG. 6 are configured for the N1 and N2 spool speeds, respectively. Each branch has a two-pole digital bandpass filter 206 with a center of the band that is set by a tuning signal N1EST or N2EST derived subsequently in the tachometer circuit 67 as will be described. The accelerometer signal then is processed by a two-pole notch filter 208 with a notch that is tuned by the signal N2EST or N1EST for the other spool of that engine, thereby removing the other spool frequency from the signal in the branch for the given spool. The resultant signal is sent through a two-pole first lowpass filter 210 with a peak gain at a frequency set by the tuning signal N1EST or N2EST for the given spool. The output of the first lowpass filter 210 is a signal designated ENGN1 or ENGN2 which is a sinusoid having a frequency of the speed of the corresponding engine spool N1 or N2, respectively. The output signals from the notch filter 208 and the first lowpass filter 210 are multiplied together in component 212 in each branch and the sign of the product is determined. These operations produce an output signal designated PTN1 or PTN2 which is a pulse train with a variable duty cycle having a frequency twice the associated spool speed.

The respective spool signals are fed from the engine sensor signal conditioning logic 204 for further processing by an N1 channel 214 or an N2 channel 216. The two channels 214 and 216 are identical in composition with the components of the N1 channel 214 being shown functionally in FIG. 7 which channel will be described in detail. The PTN1 signal is applied to a unity gain second lowpass filter 218 having a cutoff frequency of approximately 0.1 Hz, which produces an average output that is indicative of the duty cycle of the input signal and thus the tuning of the filters in the engine sensor signal conditioning logic 204. When the first lowpass filter 210 is tuned properly, the phase difference of between signals at its input and output is ninety degrees. Thus, the duty cycle of signal PTN1 is fifty percent and the output of second lowpass filter 218 is fifty percent of the peak value of the PTN1 signal. The output of the second lowpass filter 218 is applied to a comparator which produces a binary output that denotes whether the filtered PTN1 signal is within a given range Of values which indicate acceptable tuning of the filters. A high binary logic level indicates improper tuning. The output of the comparator 220 is inverted by a tune indicator 222 to produce a signal designated LOCKN1 in which a high binary logic level indicates proper filter tuning.

The output of comparator 220 operates a switch 233 which controls the input to an integrator 234. When the adaptive filter 210 is not properly tuned, switch 233 feeds the PTN1 signal to the integrator 234 and the result is applied to an input of a range limiter 236. This latter component 236 prevents the integrator output from exceeding predefined minimum and maximum values in which case the integrator output is clamped to the corresponding minimum or maximum value. The resultant limited signal is used as the filter tuning signal N1EST and is connected to the tuning inputs of the filters in the engine sensor signal conditioning logic 204. That connection completes a frequency-locked loop circuit which maintains the filters 206–210 tuned to the speed of the engine spools.

Referring still to FIG. 7, the LOCKN1 signal from tune indicator 222 is applied to an amplitude estimate circuit 224 in which block 226 computes the absolute value of the product of the LOCKN1 and the ENGN1 signals. The result is applied to a third lowpass filter 228 with a cutoff at approximately 10 Hz. The filtered signal from the third lowpass filter 228 is fed to a comparator 230 to determine whether the signal amplitude from the speed accelerometer 64 is too small to provide reliable tuning of the filters in the controller. The comparator 230 has a binary output signal designated AMPN1 which indicates an acceptable amplitude. The amplitude signal AMPN1 is applied to one input of AND gate 232 that has another input to which the LOCKN1 signal is applied. The AND gate 232 produces an output signal VALIDN1 which has a high logic level when the speed indication for engine spool N1 that is produced by the tachometer circuit 67 is valid.

The signals produced by the tachometer circuit 67 are applied to the controllers 60 for vibration absorbers 26–29. Specifically, the N1 engine spool speed signal N1EST and the VALIDN1 signal are applied to the exemplary controller 60 for vibration absorber 26 shown in FIG. 5. FIG. 6 shows an analog implementation of such a controller, although a softare implementation on a digital processor also is feasible. The engine spool speed signal N1EST is used to tune the cascaded stages of the mass and airframe accelerometer signal filters 102 and 103.

Refering to FIG. 6, the filtered accelerometer signals FA1 and FA2 produced by preamplifier and filter circuits 65 and 66 are applied to the phase measure circuit 68. These signals pass through a separate precision comparator stage 150 or 152, each comprising a pair of comparators connected in series to ensure that the filter output is converted into a square wave signal which does not have clipped sinusoidal components. The resultant square wave signals are applied to inputs of an exclusive OR (XOR) gate 154 with Schmitt triggers at the inputs, such as a model 4583 integrated circuit. XOR gate 154 provides a pulsed signal, designated PHASE, having a variable duty cycle which is a function of the phase difference between the two processed accelerometer signals. At a ninety degree phase difference, the duty cycle is fifty percent. The frequency of the PHASE signal at the output of XOR gate 154 is twice the vibration frequency. The PHASE signal is amplified by a non-inverting amplifier stage 156 with adjustable gain. The capacitor 155 within amplifier stage 156 integrates the pulsed PHASE signal into a signal with a mean voltage level that corresponds to the duty cycle of the pulses. That signal oscillates between its mean level and the size of the ripples depend on the RC time constant of the capacitor network. Thus the voltage level at the output of amplifier stage 156 may vary slightly even when the vibration absorber 26 is properly tuned.

When the resonant frequency of the vibration absorber 26 matches the frequency of vibration in the airframe along the axis of accelerometer 61, the two filtered accelerometer signals FA1 and FA2 will be in quadrature, i.e. ninety degrees out of phase. At that time, phase measure circuit 68 produces an output voltage level designated $V_{90}$ indicative of the quadrature relationship; for example, the nominal level of $V_{90}$ can be one-half the supply voltage to phase measure circuit 68. As noted above, the actual voltage fluctuates because it corresponds to the integral of a pulse train signal.

Phase deviation of the two filtered accelerometer signals FA1 and FA2 from quadrature alters the output voltage from the phase measure circuit 68 whereby the magnitude of the difference between the output voltage and the quadrature voltage level $V_{90}$ indicates the magnitude of the phase difference from quadrature, and the direction of voltage difference denotes the direction of the phase shift between the accelerometer signals A1 and A2.

The output of the phase measure circuit 68 is applied to the control logic 70 having an input connected to a pair of Schmitt triggers 160 and 162, the combined operation of which define a voltage range centered about the quadrature voltage level $V_{90}$. For example, one Schmitt trigger 160 may provide a positive hysteresis set at one volt above the quadrature voltage level $V_{90}$, while the other Schmitt trigger 162 is set at a negative hysteresis at one volt below the quadrature voltage $V_{90}$. Resistors networks 164 and 166 define that voltage range.

The output signals from the two Schmitt triggers 160 and 162 are applied to inputs of OR gate 159. When the phase measure circuit's output voltage is outside the two-volt range centered at the quadrature voltage level $V_{90}$, the OR gate 159 causes the output gate 169 of the control logic 70 to produce a low DISABLE signal, otherwise a high DISABLE signal is produced. As will be described, a high DISABLE signal inhibits operation of the motor assembly 50 and thus the alteration of the spring stiffness for the vibration absorber. Therefore if a significant phase difference between the signals from accelerometers 61 and 63 occurs, the phase measure output signal PHASE will be outside the dead band range of the OR gate 159 resulting in activation of the motor assembly 50. Circuit section 158 prevents the normal ripple in the phase measure output signal about the quadrature voltage level $V_{90}$ from altering the tuning of the vibration absorber 26.

The output from one of the Schmitt triggers 160 in circuit section 158 is used as a DIRECTION signal which indicates the direction that the motor assembly 50 should move to adjust the vibration absorber resonant frequency.

The control logic 70 also produces a high DISABLE signal in response to a signal from an amplitude monitor 74 which receives signal FA1 produced by the airframe accelerometer preamplifier and filter circuit 65. The FA1 signal passes through a buffer stage 170 and an amplifier stage 172 which applies a positive gain to positive signal levels and zero gain to negative signal levels. Capacitor 173 integrates the resultant signal at the output of the amplifier stage 172. The integrated signal is fed to a comparator stage 174 that produces an AMPLITUDE ABORT signal which is applied to OR gate 169 in order to produce the DISABLE signal.

Therefore, if the amplitude of the airframe accelerometer signal A1 becomes too small to provide reliable tuning of the vibration absorber 26, the AMPLITUDE ABORT signal from amplitude monitor 74 causes control logic 70 to produce a high DISABLE signal. That action inhibits alteration of the vibration isolator tuning under such conditions.

Referring again to FIG. 5, the DISABLE and DIRECTION signals are coupled to a conventional stepper motor driver 76. The motor driver 76 responds to these signals by producing power signals for operating the stepper motor 52 in assembly 50 to alter the resonant frequency of the vibration absorber 26.

When the vibration absorber 26 is properly tuned to the frequency of airframe vibration, the signals A1 and A2 from the accelerometers 61 and 63 are in quadrature. This signal state causes the controller 60 to produce a high DISABLE signal which inhibits the motor driver 76 from operating the motor assembly 50. When the vibration absorber 26 is not properly tuned, the signals A1 and A2 from the airframe and proof-mass accelerometers 61 and 63 will be out of quadrature. This condition results in the phase measure circuit output signal being outside the dead band range set by the Schmitt triggers 160 and 162 in the control logic 70. As a consequence, the control logic 70 produces a low DISABLE signal which enables the motor driver 76 to produce a drive signal for the stepper motor within the motor assembly 50. That drive signal causes the stepper motor to move in the direction specified by the DIRECTION signal from the control logic 70.

The motor assembly 50 turns the output shaft 54 which drives the thrust bearing 44 to alter the spacing between the proof-mass 32 and the tubular section 48 of motor assembly 50 in FIG. 4. This movement varies the compression of the flexure rods 40 and 59, thereby changing the stiffness of the spring in the vibration absorber 26. This change in spring stiffness alters the resonant frequency of vibration absorber 26 until it matches the frequency of vertical vibration in the airframe pylon 24 due to engine spool N1. When that match occurs, the signals from the two accelerometers 61 and 63 once again will be in quadrature causing the controller 60 to produce a high DISABLE signal thereby terminating operation of the motor assembly 50. Similar tuning of the other vibration absorbers 27–29 occurs to adjust for vibration changes.

In this manner, the controller 60 operates motor assembly 50 to dynamically adjust the resonant frequency of vibration absorber 26 to track variations in vibration frequency resulting from changes in aircraft engine speed. In addition the system compensates for variation in resonant frequency which result from changes in temperature or material aging. By means of this adaptive tuning, the mass-spring system of vibration absorber 26 provides high quality factor resonance at the precise disturbance frequency.

Although the control circuit 67 has been described in terms of discrete circuit elements, such as filters, integrators and comparators, a skilled artisan will recognize that the signal processing function being performed by such circuit elements could be performed by software executed in a digital signal processor.

We claim:

1. A vibration absorber for a vehicle which has an engine attached to a frame by a mounting structure, the vibration absorber comprising:
   a mounting member for attaching to the vehicle;
   a mass;
   a spring connected between the mounting member and the mass, and having a stiffness which defines a resonant frequency at which the mass vibrates;
   a mechanism which adjusts stiffness of the spring to alter the resonant frequency;
   a first sensor which is adapted to produce a first signal indicating vibration of the frame;
   a second sensor which produces a second signal indicating vibration of the mass;
   a third sensor adapted to be coupled to the mounting structure for sensing vibration of the engine and producing a third signal indicative of engine vibration; and
   a tachometer circuit connected to the third sensor and indirectly producing, in response to the third signal, a speed signal representing speed of the engine; and
   a controller connected to the first, second and third sensors and responding to the first signal, the second signal and the speed signal by operating the mechanism to adjust the resonant frequency so that the spring and the mass resonate to absorb the vibration of the frame.

2. The vibration absorber as recited in claim 1 wherein the first sensor is adapted to be coupled to the frame.

3. The vibration absorber as recited in claim 1 wherein the controller has a tunable filter which processes the first signal and the second signal, and which is tuned in response to the speed signal.

4. A vibration absorbing system for an aircraft which has a fuselage to which an engine is attached by a mounting structure, the vibration absorbing system comprising: a first sensor adapted to produce a first signal indicating vibration of the fuselage along a first axis; a second sensor adapted to produce a second signal indicating vibration of the fuselage along a second axis; first and second vibration absorbers each having a mounting member adapted to be attached to the mounting structure and a separate mass coupled to the each mounting member by a spring which has a stiffness that defines a resonant frequency at which the mass vibrates, each of the first and second vibration absorbers also having a mechanism which adjusts stiffness of the spring to alter the resonant frequency; a third sensor adapted to be coupled to the mounting structure for sensing vibration of the engine and adapted to produce a third signal indicative of engine vibration;
   a tachometer circuit connected to the third sensor and indirectly producing, in response to the third signal, a speed signal representing speed of the engine;
   a first controller connected to the first sensor and having a first adaptive filter which processes the first signal, wherein the first adaptive filter is tuned in response to the speed signal, the first controller responding to the first signal by operating the mechanism of the first vibration absorber; and
   a second controller connected to the second sensor and having a second adaptive filter which processes the second signal, wherein the second adaptive filter is tuned in response to the speed signal, the second controller responding to the second signal by operating the mechanism of the second vibration absorber.

5. The vibration absorber as recited in claim 4 wherein the first axis is orthogonal to the second axis.

6. A vibration absorbing system for an aircraft which has a fuselage to which an engine is attached by a mounting structure, the engine having a first component moving at a first speed and a second component moving at a second speed, the vibration absorbing system comprising:
   a first sensor which is adapted to produce a first signal indicating vibration of the fuselage along a first axis;
   a second sensor which is adapted to produce a second signal indicating vibration of the fuselage along a second axis;
   first, second, third and fourth vibration absorbers each having a resonant frequency which is varied by a control signal;
   a third sensor adapted to be coupled to the mounting structure for sensing vibration of the engine and adapted to produce a third signal indicative of engine vibration;
   a tachometer circuit connected to the third sensor and producing, in response to the third signal, a first speed signal indicating the first speed and a second speed signal indicating the second speed;
   a first controller which responds to the first signal and the first speed signal by producing a first control signal to adjust the resonant frequency of the first vibration absorber to vibrations from the first component along the first axis;
   a second controller which responds to the first signal and the second speed signal by producing a second control signal to adjust the resonant frequency of the second vibration absorber to vibrations from the second component along the first axis;
   a third controller which responds to the second signal and the first speed signal by producing a third control signal to adjust the resonant frequency of the third vibration absorber to vibrations from the first component along the second axis;
   a fourth controller which responds to the second signal and the second speed signal by producing a fourth control signal to adjust the resonant frequency of the fourth vibration absorber to vibrations from the second component along the second axis.

7. The vibration absorbing system as recited in claim 6 wherein each of the first, second, third and fourth vibration absorbers has a filter which processes one of the first and second signals and which is tuned by the first, second, third and fourth control signals, respectively.

8. The vibration absorbing system as recited in claim 6 wherein the first, second, third and fourth vibration absorbers each comprise a mounting member adapted to be attached to the mounting structure, a mass coupled to the mounting member by a spring which has a stiffness that defines the resonant frequency, and a mechanism which responds to one of the first, second, third and fourth control signals by adjusting stiffness of the spring to alter the resonant frequency.

9. The vibration absorbing system as recited in claim 6 wherein the tachometer circuit comprises: a first bandpass filter in which a frequency band is tuned in response to the first speed signal, and having an input to which the third signal is applied and having a first output;

a first tunable notch filter having an input connected to the first output and having a second output, the tunable notch filter being tuned in response to the second speed signal; and a first lowpass filter with an input connected to the second output and with an output at which the first speed signal is produced, and having a cutoff frequency that is varied in response to the first speed signal.

10. The vibration absorbing system as recited in claim 9 wherein the tachometer circuit further comprises: a second bandpass filter in which a frequency band is tuned in response to the second speed signal, and having an input to which the third signal is applied and having a fourth output;

a second tunable notch filter having an input connected to the fourth output and having a fifth output, the tunable notch filter being tuned in response to the first speed signal; and a second lowpass filter with an input connected to the fifth output and with a sixth output at which the second speed signal is produced, and having a cutoff frequency that is varied in response to the second speed signal.

* * * * *